United States Patent Office 3,462,618
Patented Aug. 19, 1969

3,462,618
WAVEFORM GENERATOR FOR GENERATING A FAMILY OF SINUSOIDAL CURVES
Jiro Miyata, Kawasaki-shi, Japan, assignor to Fujitsu Limited, Kawasaki, Japan, a corporation of Japan
Filed May 3, 1967, Ser. No. 635,922
Claims priority, application Japan, May 14, 1966, 41/30,513
Int. Cl. G06g 7/12; H03k 1/02
U.S. Cl. 307—229                     15 Claims

ABSTRACT OF THE DISCLOSURE

A first current supply circuit is connected to a capacitor for electrically charging the capacitor. A second current supply circuit is connected to the capacitor for decreasing the electrical charge on the capacitor. A first voltage shaper applies a first voltage of exponentially decreasing amplitude to the first current supply circuit to control such circuit. A second voltage shaper applies a second voltage of exponentially increasing amplitude to the second current supply circuit to control such circuit, whereby the variation of the electrical charge of the capacitor by the first and second current supply circuits provides at the capacitor a family of curves branching from a parent curve at different altitudes and extending for different durations.

Description of the invention

The present invention relates to a waveform generator. More particularly, the invention relates to a waveform generator for generating a family of curves.

The family of curves generated by the waveform generator of the present invention branches from a parent curve at different altitudes and extends for different durations. Such a family of curves may be called analog voltage waveforms since they are of suitable configuration for use in an analog converter and other analog equipment.

Waveforms of the type produced by the waveform generator of the present invention have previously been derived from a portion of an oscillating or sine wave or the readout wave of a magnetic signal recorded on a tape or card. In these methods, the absolute time of the waveform is fixed, so that the beginning of self-oscillation must be determined by synchronous control. The synchronous control is difficult to accomplish and is therefore a disadvantage of the prior art systems. Another disadvantage of the prior art systems is that the waveforms produced are constant in shape and size. Waveforms of the type produced by the waveform generator of the present invention may be provided by an asynchronous method or system, but in such method or system, the descending portion becomes linear, so that curves of the desired shape cannot be produced.

The principal object of the present invention is to provide a new and improved waveform generator. The waveform generator of the present invention avoids the disadvantages of the systems of the prior art. The waveform generator of the present invention is of simple structure and utilizes a simple asynchronous control. The waveform generator of the present invention produces a family of curves of desired shape and size, which shape and size are variable as desired, the curves branching from a parent curve at diffeernt altitudes and extending for different durations. The waveform generator of the present invention is efficient, effective and reliable in operation.

In accordance with the present invention, a waveform generator for generating a family of curves branching from a parent curve at different altitudes and extending for different durations comprises a charging capacitor having an output. A first circuit is connected to the charging capacitor for electrically charging the charging capacitor with a first voltage of exponentially decreasing amplitude to the charging capacitor. A second circuit is connected to the charging capacitor for electrically decreasing the electrical charge of the charging capacitor with a second voltage of exponentially increasing amplitude to the charging capacitor, whereby the variation of the electrical charge of the charging capacitor by the first and second circuits provides at the output of the charging capacitor a family of curves branching from a parent curve at different altitudes and extending for different durations. The first circuit comprises a first current supply circuit connected to the charging capacitor for electrically charging the charging capacitor. A first voltage circuit is connected to the first current supply circuit for applying a first voltage of exponentially decreasing amplitude to the first current supply circuit to control the first current supply circuit. The second circuit comprises a second current supply circuit connected to the charging capacitor for decreasing the electrical charge of the charging capacitor. A second voltage circuit is connected to the second current supply circuit for applying a second voltage of exponentially increasing amplitude to the second current supply circuit to control the second current supply circuit.

The first voltage circuit comprises an integration circuit having a first capacitor and a first resistor in series circuit arrangement. The first voltage is derived across the first resistor. The second voltage circuit comprises an integration circuit having a second capacitor and a second resistor in series circuit arrangement. The second voltage is derived across the second capacitor. The first voltage circuit comprises a switch connected across the first capacitor for short-circuiting the first capacitor to reduce the first voltage to zero. The first current supply circuit comprises first and second transistors each having emitter, collector and base electrodes. The base electrode of the first transistor is connected to one end of the first resistor and the base electrode of the second transistor is connected to the other end of the first resistor. The emitter electrodes of the first and second transistors are connected to each other via a third resistor. A bias voltage is applied to the collector electrode of the first transistor. The collector electrode of the second transistor is connected to the charging capacitor. The second voltage circuit comprises a switch connected across the second capacitor for short-circuiting the second capacitor to reduce the second voltage to zero. The second current supply circuit comprises third and fourth transistors each having emitter, collector and base electrodes. The base electrode of the third transistor is connected to one electrode of the second capacitor and the base electrode of the fourth transistor is connected to the other electrode of the second capacitor. The emitter electrodes of the third and fourth transistors are connected to each other via a fourth resistor. A bias voltage is applied to the collector electrode of the fourth transistor. The collector electrode of the third transistor is connected to the charging capacitor.

A diode clamp is connected to the charging capacitor for varying the charging potential of the charging capacitor relative to a determined voltage magnitude. Control voltages are applied to both ends of the series circuit arrangement of the first capacitor and the first resistor. The control voltages are varied to vary the shapes of the family of curves in accordance therewith.

In order that the present invention may be readily carried into effect, it will now be described with refernce to the accompanying drawing, wherein.

Figure 1:
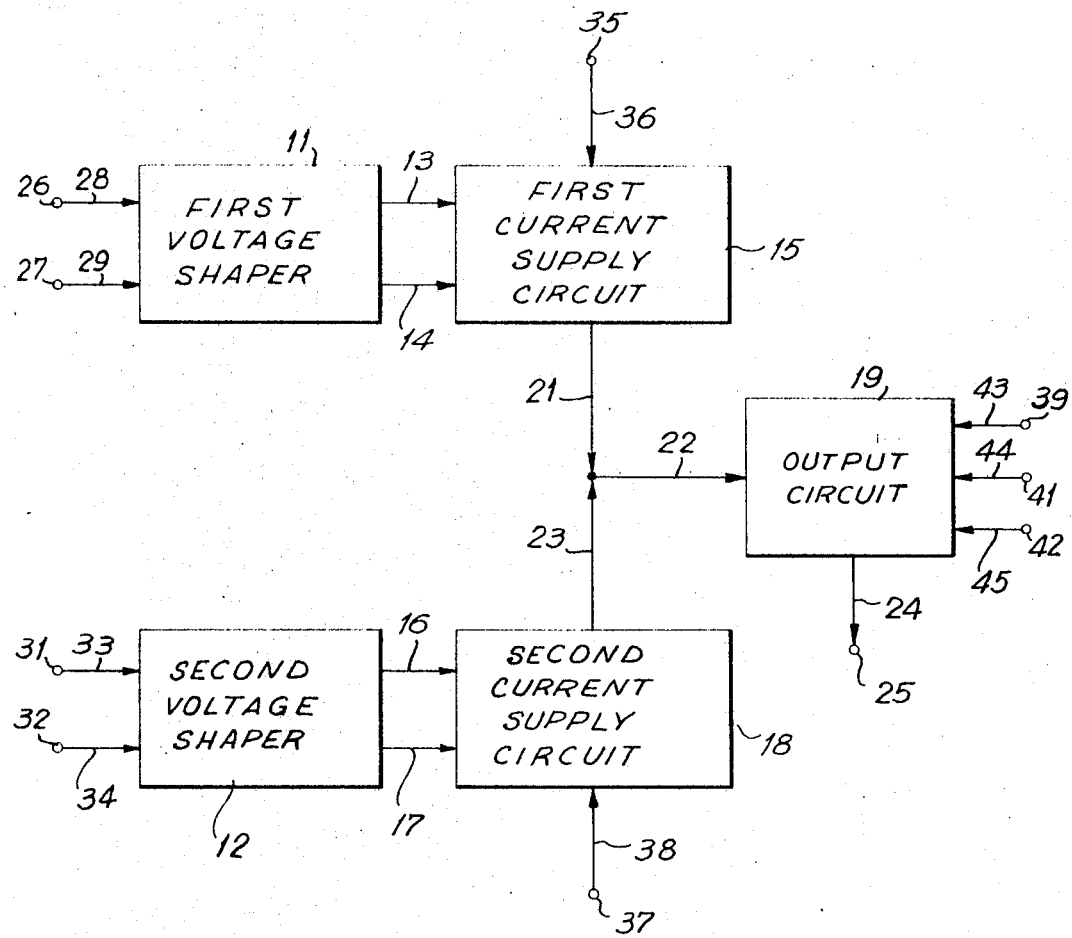
FIG. 1 is a block diagram of an embodiment of the waveform generator of the present invention.

In the block diagram of FIG. 1, the waveform generator of the present invention comprise a first voltage shaper 11 which functions to generate a first voltage of exponentially decreasing amplitude. A second voltage shaper 12 functions to generate a second voltage of exponentially increasing amplitude. The first voltage is applied via leads 13 and 14 to a first constant current supply circuit 15. The second voltage is applied via leads 16 and 17 to a second constant current or current supply circuit 18.

The first current supply circuit 15 detects the first voltage and utilizes said voltage to control its current output so that the first current supplied by said first current supply circuit decreases exponentially in amplitude. The second current supply circuit 18 detects the second voltage and utilizes said second voltage to produce a second current which increases exponentially in amplitude. The first current from the first current supply circuit 15 is supplied to an output circuit 19 via leads 21 and 22. The second current from the second current supply circuit 18 is supplied to the output circuit via a lead 23 and the lead 22. The output circuit comprises a charging component such as, for example, a capacitor (FIG. 2), and a charging circuit therefor.

The output circuit 19 has an output lead 24 and an output terminal 25 on said output lead at which it provides a family of curves (FIG. 4) branching from a parent curve at different altitudes and extending for different durations. The family of curves produced at the output terminal 25 is the resultant variation of the electrical charge of the charging component of the output circuit 19 provided by the first and second currents supplied to said output circuit. The operation of the waveform generator to produce the family of curves provided at the output terminal 25 is hereinafter described in greater detail.

In FIG. 1, input terminals 26 and 27 which are connected to the inputs of the first voltage shaper 11 via leads 28 and 29, respectively, input terminals 31 and 32 which are connected to the inputs of the second voltage shaper 12 via leads 33 and 34, respectively, input terminal 35 which is connected to the first current supply circuit 15 via lead 36, input terminal 37 which is connected to the second current supply circuit 18 via lead 38, and input terminals 39, 41 and 42 which are connected to the output circuit 19 via leads 43, 44 and 45, respectively, are control voltage terminals. Various supply or control voltages for providing normal operation of the waveform generator are applied to the input terminals.

The voltage applied to the input terminal 26 may be +6 volts. The voltage applied to the input terminal 27 may be zero volts. The voltage applied to the input terminal 31 may be −12 volts. The voltage applied to the input terminal 32 may be −24 volts. The voltage applied to the input terminal 35 may be +12 volts. The voltage applied to the input terminal 37 may be −30 volts. The voltage applied to the input terminal 39 may be −8 volts. The voltage applied to the input terminal 41 may be zero volts. The voltage applied to the input terminal 42 may be −12 volts.

Figure 2:
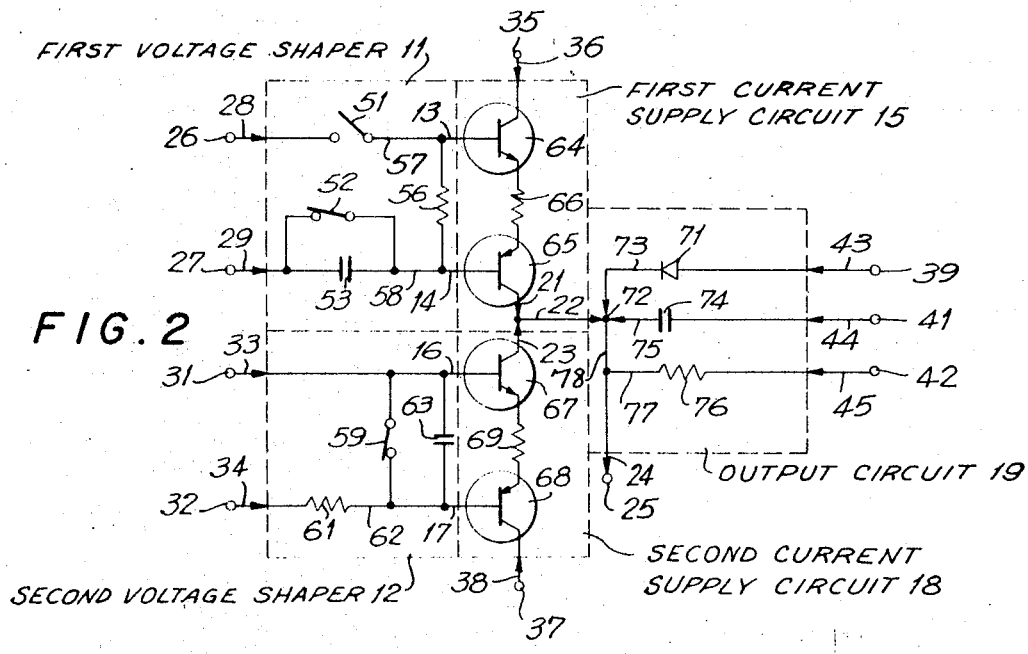
FIG. 2 is a circuit diagram of the embodiment of FIG. 1.

In FIG. 2, which is a circuit diagram of the waveform generator of the present invention, a preferred circuit arrangement is disclosed for each of the components 11, 12, 15, 18 and 19 of FIG. 1. The first voltage shaper 11 comprises a first control switch 51 connected in series with the input terminal 26 via the lead 28. A second control switch 52 is connected in parallel with a first capacitor 53 and the parallel circuit 52, 53 is connected in series with the input terminal 27 via the lead 29. The first control switch 51 is connected to one end of a first resistor 56 via lead 57, and the parallel circuit 52, 53 is connected to the other end of said first resistor via lead 58. When the waveform generator is not in operation, the first control switch 51 is open and the second control switch 52 is closed thereby short-circuiting the first capacitor 53. When the waveform generator is in operation, the first control switch 51 is closed and the second control switch 52 is open thereby permitting charging of the first capacitor 53.

The second voltage shaper 12 comprises a third control switch 59 connected to the input terminal 31 via the lead 33 and to the input terminal 32 via the lead 34, a second resistor 61 and a lead 62. A second capacitor 63 is connected in parallel with the third control switch 59. The third control switch 59 is closed in the inoperative condition of the waveform generator thereby short-circuiting the second capacitor 63, and is open when the waveform generator is in operation. The positions of the first, second and third control switches 51, 52 and 59 shown in FIG. 2 are those for the non-operating or non-operative condition of the waveform generator. The control input voltage are applied to the voltage shapers via the input terminals 26, 27, 31 and 32.

The first current supply circuit 15 comprises a first transistor 64 and a second transistor 65. Each of the first and second transistors has emitter, collector and base electrodes. The first transistor 64 is of NPN type and the second transistor 65 is of PNP type. The emitter electrodes of the first and second transistors 64 and 65 are connected to each other via a third resistor 66. The base electrode of the first transistor 64 is connected to one end of the first resistor 56 of the first voltage shaper 11 via a lead 13 and the base electrode of the second transistor 65 is connected to the other end of said first resistor via the lead 14. The collector electrode of the first transistor 64 is connected to the input terminal 35 via the lead 36. The collector electrode of the second transistor 65 is connected to the output circuit 19 via the leads 21 and 22.

The second current supply circuit 18 comprises a third transistor 67 and a fourth transistor 68. Each of the third and fourth transistors 67 and 68 has emitter, collector and base electrodes. The third transistor 67 is of NPN type and the fourth transistor 68 is of PNP type. The emitter electrodes of the third and fourth transistors 67 and 68 are connected to each other via a fourth resistor 69. The base electrode of the third transistor 67 is connected to one electrode or plate of the second capacitor 63 of the second voltage shaper 12 via the lead 16 and the base electrode of the fourth transistor 68 is connected to the other electrode or plate of said second capacitor via the lead 17. The collector electrode of the fourth transistor 68 is connected to the input terminal 37 via the lead 38. The collector electrode of the third transistor 67 is connected to the output circuit 19 via the leads 23 and 22.

The voltages applied via the input terminals 35 and 37 bias the first and second transistors 64 and 65 for normal operation and bias the third and fourth transistors 67 and 68 for normal operation, respectively.

The output circuit 19 comprises a plurality of parallel branches. A first branch comprises a diode 71. The anode of the diode 71 is connected to the input terminal 39 via the lead 43 and the cathode of said diode is connected to a common point 72 via a lead 73. The lead 22 from the outputs of the first and second current supply circuits 15 and 18 is also connected to the common point 72. A second branch comprises a charging component or charging capacitor 74. One electrode or plate of the charging capacitor 74 is connected to the input terminal 41 via the lead 44 and the other electrode or plate of said charging capacitor is connected to the common point 72 via a lead 75. A third branch comprises a fifth resistor 76. The fifth resistor 76 is connected at one end to the input terminal 42 via the lead 45 and is connected at its other end to the common point 72 via a lead 77 and a lead 78. The lead 78 from the common point 72 is connected via the lead 24 to the output terminal 25, so that said output terminal is connected to said common point via the leads 78 and 24.

The first voltage having an exponentially decreasing amplitude is provided across the first resistor 56 of the first voltage shaper 11. The first resistor 56 is connected in series with the first capacitor 53 of the first voltage shaper 11. The second voltage having an exponentially increasing amplitude is provided across the second capacitor 63 of the second voltage shaper 12. The second capacitor 63 is connected in series with the second resistor 61 in the second voltage shaper 12. Thus, each of the first and second voltage shapers 11 and 12 comprises a resistance, capacitance integration circuit comprising the series circuit arrangement of a resistor and a capacitor.

The resistance, capacitance integration circuit is a known circuit and functions in a known manner. In an integration circuit, the difference between the potentials at the two electrodes of the capacitor is not as great at the beginning as it is after charging of the capacitor, since such difference increases exponentially with time. The difference between the potentials at the two ends of the resistors is great at the beginning of the charging of the capacitor, but decreases exponentially with time.

The first constant current or current supply circuit 15 connects the first voltage shaper 11 to the charging capacitor 74 of the output circuit 19 and provides said charging capacitor with a positive charge which decreases exponentially in amplitude. The second constant current or current supply circuit 18 interconnects the second voltage shaper 12 and the charging capacitor 74 of the output circuit 19 and provides said charging capacitor with a negative charge which increases exponentially in amplitude. The positive electrical charge is due to the connection of the first current supply circuit 15 across the resistor 56 of the integration circuit 53, 56 of the first voltage shaper 11. The negative electrical charge provided by the second current supply circuit 18 is due to the connection of said current supply circuit across the capacitor 63 of the integration circuit 61, 63 of the second voltage shaper 12. The negative charge provided by the second current supply circuit 18 is in effect an absorption of the positive charge, and said second current supply circuit functions as a current absorbing circuit.

The function of the first and second transistors 64 and 65 of the first current supply circuit 15 and of the third and fourth transistors 67 and 68 of the second current supply circuit 18 is to increase the input impedance of the output circuit 19. The first and second current supply circuits 15 and 18 thus function as constant current circuits. In theory, the first voltage having an exponentially decreasing amplitude may be derived directly from the first voltage shaper 11 and the second voltage having an exponentially increasing amplitude may be derived directly from the second voltage shaper 12, the first and second current supply circuits 15 and 18 thus being eliminated. In actuality, however, this is not the case, since it is difficult to derive the desired characteristic due to the bias voltages and the interference of the first and second voltages with each other. In order to derive the desired characteristics, the constant current circuits 15 and 18 are utilized.

In the output circuit 19, the diode 71 of the first branch functions as a clamp and the resistor 76 of the third branch functions as a bias component. The clamping 71 and the bias component 76 are utilized in the waveform generator disclosed in FIGS. 1 and 2 in order to prevent a family of negative waves from being provided at the output terminal 25. If the circuit is opened after the first and second capacitors 53 and 63 of the first and second voltage shapers 11 and 12, respectively, are charged, that is, if the corresponding control switches 52 and 59 are changed or switched over to their conditions, a family of curves which are negative is produced by the charging capacitor 74 of the output circuit 19. Such a family of negative curves is symmetrical with the curves shown in FIG. 4 about the abscissa.

Although the negative curves may be provided if desired, since the negative curves are not desired in the present invention, they may be eliminated in the output circuit 19. The negative curves are eliminated by the diode 71 functioning as a clamp. When the potential of the charging capacitor 74 becomes less than the voltage applied to the input terminal 39, the diode 71 is immediately switched to its conductive condition and thereby prevents such potential from decreasing to a point lower than said voltage applied to said input terminal.

In the inoperative or non-operative condition of the waveform generator of FIG. 2, the first control switch 51 is open, as shown, and the second and third control switches 52 and 59 are closed as shown. The voltages at the two electrodes of the first and second capacitors 53 and 63 are therefore zero since said capacitors are short-circuited, and the base potentials of the first and second transistors 64 and 65 are equal as are the base potentials of the third and fourth transistors 67 and 68. Each of the first, second, third and fourth transistors 64, 65, 67 and 68 is thus in its non-conductive or OFF condition. The diode 71 is biased to its conductive condition so that it clamps the output voltage at the voltage applied to the input terminal 39.

Figure 3:
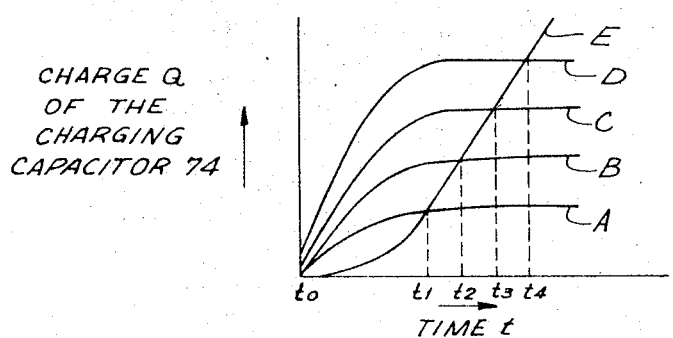
FIG. 3 is a graphical presentation of the charge of the charging capacitor of the circuit of FIG. 2.

In the operating or operative condition of the waveform generator of FIG. 2, the first control switch 51 is closed at a time $t_0$ (FIG. 3). The second and third control switches 52 and 59 are opened at the time $t_0$. The potential difference between the voltages applied to the input terminals 26 and 27 is instantaneously provided across the first resistor 56 and such potential difference is exponentially decreased with time. That is, the integration circuit 53, 56 gradually brings the base potential of the second transistor 65 to approach the voltage applied to the input terminal 26. When the base potential of the second transistor 65 reaches the voltage applied to the input terminal 26, the potential difference across the first resistor 56 becomes zero. On the other hand, the potential difference between the two electrodes of the second capacitor 63 is gradually increased exponentially by the integration circuit 61, 63 until it reaches the difference between the voltages applied to the input terminals 31 and 32.

The potential difference across the first resistor 56 is applied to the third resistor 66 via the first and second transistors 64 and 65 and a first current is supplied to the output circuit 19 to charge the charging capacitor 74. The first current has a magnitude provided by dividing the potential difference across the first resistor 56 by the resistance of the third resistor 66 and flows in a direction which charges the charging capacitor 74. When the charging capacitor 74 is charged, the potential at the output terminal 25 of the output circuit 19 is gradually increased. At such time, however, the diode 71 is biased to its non-conductive condition.

The resistance of the fifth resistor 76 of the output circuit 19 is sufficiently great so that only a small amount of current passes through said resistor. On the other hand, the second current supply circuit 18 supplies a second current to the charging capacitor 74. The second current has a magnitude which is provided by dividing the potential difference between the electrodes of the second capacitor 63 by the resistance of the fourth resistor 69, and said second current flows in a direction in which it discharges the charging capacitor 74. The magnitude of the second current gradually increases with time until the discharging current becomes greater than the charging current. The potential at the output terminal 25 of the output circuit 19 then decreases.

Figure 4:
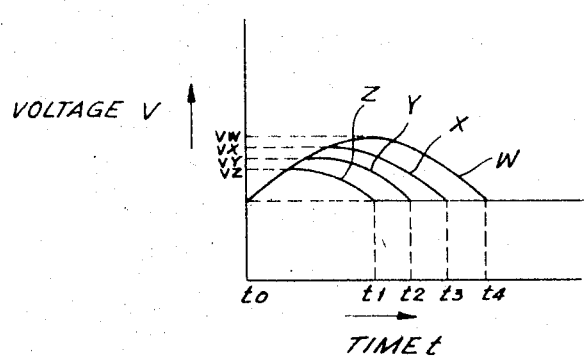
FIG. 4 is a graphical presentation of the family of curves produced by the waveform generator of the present invention.

After a determined period of time, the charging current becomes zero and only the discharging current is present. The potential at the output terminal 25, however, does not decrease to a point lower than the voltage applied to the input terminal 39, since the diode 71 is again biased to its conductive or forward condition. If the first control switch 51 is then opened and the second and third control switches 52 and 59 are then closed, the first and second capacitors 53 and 63 are then discharged in a short period of time through the corresponding control switches and the waveform generator is returned to its non-operating condition. The output terminal 25 is not affected, however. The foregoing operation produces at the output terminal 25 of the output circuit 19 a family of curves, as shown in FIG. 4, branching from a parent curve at different altitudes and extending for different durations.

FIG. 3 illustrates the charge of the charging capacitor 74. In FIG. 3, the abscissa indicates the time $t$ and the ordinate represents the charge Q of the charging capacitor 74. The voltage applied to the input terminal 26 may be varied, for example, from +2 volts to +3 volts, to +4 volts, to +5 volts and to +6 volts. When the voltage applied to the input terminal 26 is +2 volts, the charge Q versus time is indicated by the curve A. When the voltage applied to the input terminal 26 is +3 volts, the charge Q versus time is illustrated by curve B. When the voltage applied to the input terminal 26 is +4 volts, the charge Q versus time is represented by curve C. When the voltage applied to the input terminal 26 is +5 volts, the charge Q versus time is illustrated by a curve D. The discharge of the charging capacitor 74 is illustrated by curve E.

A charge provided by subtracting the magnitude of the discharge from the charge Q is thus provided at the charging capacitor 74 and in turn provides the output voltage at the output terminal 25. As shown in FIG. 3, each of the curves A, B, C and D intersects the curve E at a point different from the others and the magnitudes of the electrical charges and the charging times are also different for each. The curves of FIG. 4 which are produced at the output terminal 25 of the output circuit 19 of FIG. 2 are thus as shown in FIG. 4.

The family of curves produced by the waveform generator of the present invention are shown as curves W, X, Y and Z. The parent curve W is of generally sinusoidal configuration, being the positive half cycle thereof. The curves W, X, Y and Z are voltage curves, with the abscissa of FIG. 4 representing the time $t$ and the ordinate representing the voltage V. The level of the voltage applied to the input terminal 39 of the output circuit 19 of the waveform generator of FIG. 2 is indicated as voltage V39. The size of each of the curves W, X, Y and Z may be varied by a variation of the input terminal 26 of FIG. 2 and the shape of said curves may be varied by variation of the time constant of the waveform generator of the present invention. The shapes of the ascending and descending portions of each of the family of curves W, X, Y and Z may be varied by controlling the time of operation of the control switches 59, 51 and 52 and by varying the resistance of the third and fourth resistors 66 and 69. That is, the third control switch 59 may be delayed in opening relative to the opening of the first and second control switches 51 and 52 in order to vary the shapes of the curves W, X, Y and Z.

In FIG. 4, each of the curves W, X, Y and Z is a positive curve with a positive-sloped ascending portion and a negative sloped descending portion. Each of the curves X, Y and Z branches from the parent curve W. The curve Z branches from the parent curve W at an altitude VZ. The curve Y branches from the parent curve W at an altitude VY which is higher than VZ. The curve X branches from the parent curve VW at an altitude VX which is larger than the altitudes VZ and VY. The altitude VW of the parent curve W is the maximum altitude. The curves Z, Y, X and W have durations of $t1$, $t2$, $t3$ and $t4$, respectively, each of which is longer than the preceding one.

Each of the curves W, X, Y and Z has a substantially linear ascending leading edge and a substantially sinusoidal descending trailing edge with a rounded sinusoidal peak area. Each of the curves W, X, Y and Z is similar in shape to the others so that said curves are analogous.

While the invention has been described by means of a specific example and in a specific embodiment, I do not wish to be limited thereto, for obvious modifications will occur to those skilled in the art without departing from the spirit and scope of the invention.

I claim:

1. A waveform generator for generating a family of substantially sinusoidal curves branching from a parent curve at different altitudes and extending for different durations, said waveform generator comprising
    a single charging means having an output;
    first circuit means connected to said charging means for electrically charging said charging means with a first voltage of exponentially decreasing amplitude to said charging means; and
    second circuit means connected to said charging means for electrically decreasing the electrical charge of said charging means with a second voltage of exponentially increasing amplitude of said charging means, whereby the variation of the electrical charge of said charging means by said first and second circuit means provides at the output of said charging means a family of substantially sinusoidal curves branching from a parent curve at different altitudes and extending for different durations.

2. A waveform generator as claimed in claim 1, wherein said charging means comprises a charging capacitor.

3. A waveform generator as claimed in claim 1, wherein said first circuit means comprises a first current supply circuit connected to said charging means for electrically charging said charging means and first voltage means connected to said first current supply circuit for applying a first voltage of exponentially decreasing amplitude to said first current supply circuit to control said first current supply circuit, and said second circuit means comprises a second current supply circuit connected to said charging means for decreasing the electrical charge of said charging means and second voltage means connected to said second current supply circuit for applying a second voltage of exponentially increasing amplitude to said second current supply circuit to control said second current supply circuit, whereby the variation of the electrical charge of said charging means by said first and second current supply circuits provides at the output of said charging means a family of curves branching from a parent curve at different altitudes and extending for different durations.

4. A waveform generator as claimed in claim 3, wherein said charging means comprises a charging capacitor.

5. A waveform generator as claimed in claim 3, wherein said first voltage means comprises an integration circuit having a first capacitor and a first resistor in series circuit arrangement, said first voltage being derived across said first resistor.

6. A waveform generator as claimed in claim 3, wherein said second voltage means comprises an integration circuit having a second capacitor and a second resistor in series circuit arrangement, said second voltage being derived across said second capacitor.

7. A waveform generator as claimed in claim 3, wherein said first voltage means comprises an integration circuit having a first capacitor and a first resistor in series circuit arrangement, said first voltage being derived across said first resistor and said second voltage means comprises an integration circuit having a second capacitor and a second resistor in series circuit arrangement, said second voltage being derived across said second capacitor.

8. A waveform generator for generating a family of curves branching from a parent curve at different altitudes and extending for different durations, said waveform generator comprising
    charging means comprising a charging capacitor having an output;
    first circuit means connected to said charging means for electrically charging said charging means with a first voltage of exponentially decreasing amplitude to said charging means, said first circuit means comprising a first current supply circuit connected to said charging means for electrically charging said charging means and first voltage means connected to said first current supply circuit for applying a first voltage of exponentially decreasing amplitude to said first current supply circuit to control said first current supply circuit, said first voltage means comprising an integration circuit having a first capacitor, a first resistor in series circuit arrangement and switch means connected across said first capacitor for short-circuiting said first capacitor to reduce said first voltage to zero, said first voltage being derived across said first resistor; and second circuit means connected to said charging means for electrically decreasing the electrical charge of said charging means with a second voltage of exponentially increasing amplitude to said charging means, said second circuit means comprising a second current supply circuit connected to said charging means for decreasing the electrical charge of said charging means and second voltage means connected to said second current supply circuit for applying a second voltage of exponentially increasing amplitude to said second current supply circuit to control said second current supply circuit, whereby the variation of the electrical charge of said charging means by said first and second current supply circuits provides at the output of said charging means a family of curves branching from a parent curve at different altitudes and extending for different durations.

9. A waveform generator for generating a family of curves branching from a parent curve at different altitudes and extending for different durations, said waveform generator comprising charging means comprising a charging capacitor having an output;

first circuit means connected to said charging means for electrically charging said charging means with a first voltage of exponentially decreasing amplitude to said charging means, said first circuit means comprising a first current supply circuit connected to said charging means for electrically charging said charging means and first voltage means connected to said first current supply circuit for applying a first voltage of exponentially decreasing amplitude to said first current supply circuit to control said first current supply circuit, said first voltage means comprising an integration circuit having a first capacitor, a first resistor in series circuit arrangement and switch means connected across said first capacitor for short-circuiting said first capacitor to reduce said first voltage to zero, said first voltage being derived across said first resistor, said first current supply circuit comprises first and second transistors each having emitter, collector and base electrodes, the base electrode of said first transistor being connected to one end of said first resistor and the base electrode of said second transistor being connected to the other end of said first resistor, a third resistor, the emitter electrodes of said first and second transistors being connected to each other via said third resistor, means for applying a bias voltage to the collector electrode of said first transistor, and the collector electrode of said second transistor being connected to said charging capacitor; and second circuit means connected to said charging means for electrically decreasing the electrical charge of said charging means with a second voltage of exponentially increasing amplitude to said charging means, said second circuit means comprising a second current supply circuit connected to said charging means for decreasing the electrical charge of said charging means and second voltage means connected to said second current supply circuit for applying a second voltage of exponentially increasing amplitude to said second current supply circuit to control said second current supply circuit, whereby the variation of the electrical charge of said charging means by said first and second current supply circuits provides at the output of said charging means a family of curves branching from a parent curve at different altitudes and extending for different durations.

10. A waveform generator for generating a family of curves branching from a parent curve at different altitudes and extending for different durations, said waveform generator comprising charging means comprising a charging capacitor having an output;

first circuit means connected to said charging means for electrically charging said charging means with a first voltage of exponentially decreasing amplitude to said charging means, said first circuit means comprising a first current supply circuit connected to said charging means for electrically charging said charging means and first voltage means connected to said first current supply circuit for applying a first voltage of exponentially decreasing amplitude to said first current supply circuit to control said first current supply circuit; and second circuit means connected to said charging means for electrically decreasing the electrical charge of said charging means with a second voltage of exponentially increasing amplitude to said charging means, whereby the variations of the electrical charge of said charging means by said first and second circuit means provides at the output of said charging means a family of curves branching from a parent curve at different altitudes and extending for different durations, said second circuit means comprising a second current supply circuit connected to said charging means for decreasing the electrical charge of said charging means and second voltage means connected to said second current supply circuit for applying a second voltage of exponentially increasing amplitude to said second current supply circuit to control said second current supply circuit, whereby the variation of the electrical charge of said charging means by said first and second current supply circuits provides at the output of said charging means a family of curves branching from a parent curve at different altitudes and extending for different durations, said second voltage means comprising an integration circuit having a second capacitor, a second resistor in series circuit arrangement and switch means connected across said second capacitor for short-circuiting said second capacitor to reduce said second voltage to zero, said second voltage being derived according to said capacitor.

11. A waveform generator for generating a family of curves branching from a parent curve at different altitudes and extending for different durations, said waveform generator comprising charging means comprising a charging capacitor having an output;

first circuit means connected to said charging means for electrically charging said charging means with a first voltage of exponentially decreasing amplitude to said charging means, said first circuit means comprising a first current supply circuit connected to said charging means for electrically charging said charging means and first voltage means connected to said first current supply circuit for applying a first voltage of exponentially decreasing amplitude to said first current supply circuit to control said first current supply circuit; and second circuit means connected to said charging means for electrically decreasing the electrical charge of said charging means with a second voltage of exponentially increasing amplitude to said charging means, whereby the variation of the electrical charge of said charging means by said first and second circuit means provides at the output of said charging means a family of curves branching from a parent curve at different altitudes and extending for different durations, said second circuit means comprising a second current supply circuit connected to said charging means for decreasing the electrical charge of said charging means and second voltage means connected to said second current supply circuit for applying a second voltage of exponentially increasing amplitude to said second current supply circuit to control said second current supply circuit, whereby the variation of the electrical charge of said charging means by said first and second current supply circuits provides at the output of said charging means a family of curves branching from a parent curve at different altitudes and extending for different durations, said second voltage means comprising an integration circuit having a second capacitor, a second resistor in series circuit arrangement and switch means connected across said second capacitor for short-circuiting said second capacitor to reduce said second voltage to zero, said second voltage being derived across said second capacitor, said second current supply circuit comprising third and fourth transistors each having emitter, collector and base electrodes, the base electrodes of said third transistor being connected to one electrode of said second capacitor and the base electrode of said fourth transistor being connected to the other electrode of said second capacitor, a fourth resistor, the emitter electrodes of said third and fourth transistors being connected to each other via said fourth resistor, means for applying a bias voltage to the collector electrode of said fourth transistor, and the collector electrode of said third transistor being connected to said charging capacitor.

12. A waveform generator for generating a family of curves branching from a parent curve at different altitudes and extending for different durations, said waveform generator comprising charging means having an output;

first circuit means connected to said charging means for electrically charging said charging means with a first voltage of exponentially decreasing amplitude to said charging means, said first circuit means comprising a first current supply circuit connected to said charging means for electrically charging said charging means and first voltage means connected to said first current supply circuit for applying a first voltage of exponentially decreasing amplitude to said first current supply circuit to control said first current supply circuit, said first voltage means comprising an integration circuit having a first capacitor and a first resistor in series circuit arrangement, said first voltage being derived across said first resistor;

second circuit means connected to said charging means for electrically decreasing the electrical charge of said charging means with a second voltage of exponentially increasing amplitude to said charging means, whereby the variation of the electrical charge of said charging means by said first and second circuit means provides at the output of said charging means a family of curves branching from a parent curve at different altitudes and extending for different durations, said second circuit means comprising a second current supply circuit connected to said charging means for decreasing the electrical charge of said charging means and second voltage means connected to said second current supply circuit for applying a second voltage of exponentially increasing amplitude to said second current supply circuit to control said second current supply circuit, whereby the variation of the electrical charge of said charging means by said first and second current supply circuits provides at the output of said charging means a family of curves branching from a parent curve at different altitudes and extending for different durations, said second voltage means comprising an integration circuit having a second capacitor and a second resistor in series circuit arrangement, said second voltage being derived across said second capacitor; and diode clamp means connected to said charging capacitor for varying the charging potential of said charging capacitor relative to a determined voltage magnitude.

13. A waveform generator as claimed in claim 7, further comprising means for applying control voltages to both ends of said series circuit arrangement of said first capacitor and said first resistor, said control voltages being varied to vary the shapes of said family of curves in accordance therewith.

14. A waveform generator as claimed in claim 9, wherein said second voltage means comprises switch means connected across said second capacitor for short-circuiting said second capacitor to reduce said second voltage to zero and said second current supply circuit comprises third and fourth transistors each having emitter, collector and base electrodes, the base electrode of said third transistor being connected to one electrode of said second capacitor and the base electrode of said fourth transistor being connected to the other electrode of said second capacitor, a fourth resistor, the emitter electrodes of said third and fourth transistors being connected to each other via said fourth resistor, means for applying a bias voltage to the collector electrode of said fourth transistor, and the collector electrode of said third transistor being connected to said charging capacitor.

15. A waveform generator as claimed in claim 14, further comprising diode clamp means connected to said charging capacitor for varying the charging potential of said charging capacitor relative to a determined voltage magnitude.

References Cited

UNITED STATES PATENTS

| | | | |
|---|---|---|---|
| 2,602,151 | 7/1952 | Carbrey | 328—183 |
| 2,971,698 | 2/1961 | Cowart et al. | 235—197 |
| 3,120,605 | 2/1964 | Nathan et al. | 235—197 |
| 3,235,751 | 2/1966 | Callan | 307—228 |
| 3,281,585 | 10/1966 | Zselectzky | 307—229 X |
| 3,296,428 | 1/1967 | Nathan | 307—229 X |
| 3,320,411 | 5/1967 | Martinez | 328—143 X |
| 3,353,012 | 11/1967 | Baude | 307—229 X |

JOHN S. HEYMAN, Primary Examiner

U.S. Cl. X.R.

235—197; 307—296; 328—127, 143